United States Patent
Tanigawa et al.

(10) Patent No.: US 8,170,573 B2
(45) Date of Patent: May 1, 2012

(54) BASE STATION APPARATUS AND WIRELESS COMMUNICATION METHOD

(75) Inventors: Hironobu Tanigawa, Tokyo (JP); Yasuhiro Nakamura, Yokohama (JP); Toru Sahara, Yokohama (JP); Nobuaki Takamatsu, Yokohama (JP)

(73) Assignee: Kyocera Corporation, Kyoto (JP)

( * ) Notice: Subject to any disclaimer, the term of this patent is extended or adjusted under 35 U.S.C. 154(b) by 423 days.

(21) Appl. No.: 12/440,432

(22) PCT Filed: Aug. 29, 2007

(86) PCT No.: PCT/JP2007/066797
§ 371 (c)(1),
(2), (4) Date: Nov. 4, 2009

(87) PCT Pub. No.: WO2008/029693
PCT Pub. Date: Mar. 13, 2008

(65) Prior Publication Data
US 2010/0128684 A1 May 27, 2010

(30) Foreign Application Priority Data
Sep. 8, 2006 (JP) .................................. 2006-244568

(51) Int. Cl.
*H04B 1/38* (2006.01)
*H04J 3/16* (2006.01)

(52) U.S. Cl. ..................... 455/452.2; 455/561; 370/468; 370/332

(58) Field of Classification Search ............... 455/452.2, 455/226.1–226.4, 561, 115.3; 370/204, 477, 370/483, 332, 333, 395.21, 395.41, 468, 370/212
See application file for complete search history.

(56) References Cited

U.S. PATENT DOCUMENTS

| | | | |
|---|---|---|---|
| 5,592,470 A * | 1/1997 | Rudrapatna et al. | 370/468 |
| 2002/0159384 A1 | 10/2002 | Classon et al. | 370/216 |
| 2003/0103589 A1 * | 6/2003 | Nohara et al. | 455/226.1 |
| 2003/0147474 A1 | 8/2003 | Ha et al. | 375/295 |
| 2006/0062140 A1 | 3/2006 | Sudo | 370/203 |
| 2009/0245173 A1 * | 10/2009 | Kano | 370/328 |
| 2011/0069669 A1 * | 3/2011 | Dwyer et al. | 370/329 |
| 2011/0194445 A1 * | 8/2011 | Riddington et al. | 455/561 |

FOREIGN PATENT DOCUMENTS

| | | |
|---|---|---|
| EP | 1 422 855 A1 | 5/2004 |
| JP | 2003-319464 | 11/2003 |
| JP | 2004-187226 | 7/2004 |
| JP | 2006-211172 | 8/2006 |
| WO | WO 02/089389 A1 | 11/2002 |

* cited by examiner

*Primary Examiner* — Lana N Le
(74) *Attorney, Agent, or Firm* — DLA Piper LLP (US)

(57) ABSTRACT

A base station apparatus which conducts a packet communication with a wireless communication terminal includes: a retransmission request detection unit which detects a retransmission request from the wireless communication terminal; a bandwidth assignment unit which assigns a communication bandwidth applied to the packet communication; a modulation class calculation portion, based on both bandwidth information regarding the bandwidth assigned by the bandwidth assignment unit and a data amount of packets corresponding to the retransmission request, calculates a modulation class applied to a retransmission in order to adjust a number of retransmitted packets to be the same as a number of previously transmitted packets; a modulation class determination unit which determines whether or not the modulation class is lower than a modulation class applied to a previous packet transmission; and a retransmission unit which retransmits packets corresponding to the retransmission request based on the determination result regarding the modulation class.

6 Claims, 5 Drawing Sheets

BASE STATION APPARATUS AND WIRELESS COMMUNICATION METHOD

TECHNICAL FIELD

The present invention relates to a base station apparatus and a wireless communication method.

Priority is claimed on Japanese Patent Application No. 2006-244568, filed Sep. 8, 2006, the content of which is incorporated herein by reference.

BACKGROUND ART

With regard to a mobile communication in which the state of data transmission path momentarily changes, there are valuable error control techniques, for example, ARQ (Automatic Repeat reQuest), that is, an automatic retransmission control, and an error correction code such as FEC (Forward Error Correction). ARQ is mainly provided as a function of MAC (Media Access Control) layer (MAC-ARQ). There are various types of ARQ methods, for example, the Stop-and-wait method, the Go-back-N method and the Selective-repeat method.

In the Stop-and-wait method, every time a transmission side transmits a packet, a reception side transmits a NACK (Negative ACKnowledgement) signal or an ACK (ACKnowledgement) signal. In addition, the transmission side retransmits the same packet as previously transmitted when receiving a NACK signal (retransmission request) and transmits a next packet when receiving an ACK signal. In the Go-back-N method, the transmission side successively transmits N packets. When receiving a retransmission request (HACK signal) from the reception side, the transmission side retransmits all packets including the packet which is requested to be retransmitted and the following packets. In Selective-repeat method, the transmission side successively transmits N packets. When receiving a retransmission request (NACK signal) from the reception side, the transmission side retransmits packets only if they are requested to be retransmitted.

[Patent Document 1] Japanese Patent Application, First Publication No. 2003-319464

With regard to the above-described MAC-ARQ, in order to accurately transmit a packet when retransmitting the packet to the reception side, there are cases in which the packet is retransmitted after switching a modulation method to another modulation method which has mow transmission rate, for example, BPSK (Binary Phase Shift Keying). In such a case, it is possible to increase the possibility to accurately transmit the packet which is retransmitted to the reception side, but there is a problem of low data throughput due to a low transmission rate.

DISCLOSURE OF INVENTION

In view of the above-described background, the present invention is conceived and has an object to prevent a low data rate of retransmission of packets when using MAC-ARQ. In addition, the present invention has an object to prevent a low throughput of packet communication.

In order to achieve the above-described objects, for example, the present invention has following aspects.

A first aspect is a base station apparatus which conducts a packet communication with a wireless communication terminal including: a retransmission request detection unit which detects a retransmission request from the wireless communication terminal; a bandwidth assignment unit which assigns a communication bandwidth applied to the packet communication; a modulation class calculation portion, based on both bandwidth information regarding the bandwidth assigned by the bandwidth assignment unit and an amount of data of packets corresponding to the retransmission request, calculates a modulation class applied to a retransmission in order to adjust a number of retransmitted packets to be the same as a number of previously transmitted packets; a modulation class determination unit which determines whether or not the modulation class is lower than a modulation class applied to a previous packet transmission; and a retransmission unit which retransmits packets corresponding to the retransmission request based on the determination result regarding the modulation class.

A second aspect is a base station apparatus of the above-described first aspect, wherein the communication bandwidth is a sub-channel used in an OFDMA method in which a communication bandwidth applied to a communication is used as a unit of a sub-channel constituted from a plurality of subcarriers.

A third aspect is a base station apparatus of the above-described first or second aspect, wherein based on the determination result of the modulation class determination unit, if the modulation class is lower than the previous packet transmission, the retransmission unit retransmits the packets corresponding to the retransmission request.

A fourth aspect is a base station apparatus of the above-described third aspect, wherein, when the retransmission unit retransmits the packets corresponding to the retransmission request based on the determination result of the modulation class, the bandwidth assignment unit assigns more sub-channels than the number of sub-channels that are assigned in the previous packet transmission.

A fifth aspect is a base station apparatus of the above-described second aspect, wherein based on the determination result of the modulation class, if the modulation class is lower than the previous packet transmission, the bandwidth assignment unit determines whether or not it is possible to release sub-channels used for other communication, and if there are sub-channels that can be released, the bandwidth assignment unit releases the sub-channels.

A sixth aspect is a wireless communication method in which a base station apparatus conducts a packet communication with a wireless communication terminal including: a retransmission request detection step of detecting a retransmission request from the wireless communication terminal; a bandwidth assignment step of assigning a communication bandwidth applied to the packet communication; a modulation class calculation step of, based on both bandwidth information regarding the bandwidth assigned by the bandwidth assignment unit and an amount of data of packets corresponding to the retransmission request, calculating a modulation class applied to a retransmission in order to adjust the number of retransmitted packets to be the same as the number of previously transmitted packets; a modulation class determination step of determining whether or not the modulation class is lower than a modulation class applied to a previous packet transmission; and a retransmission step of retransmitting packets corresponding to the retransmission request based on the determination result regarding the modulation class.

In accordance with the above-described aspects, it is possible to prevent a low data rate of retransmission of packets when using MAC-ARQ, and it is possible to reliably transmit the data to a receiver. As a result, it is possible to prevent a low throughput of packet communication.

DESCRIPTION OF THE REFERENCE SYMBOLS

Figure 1:
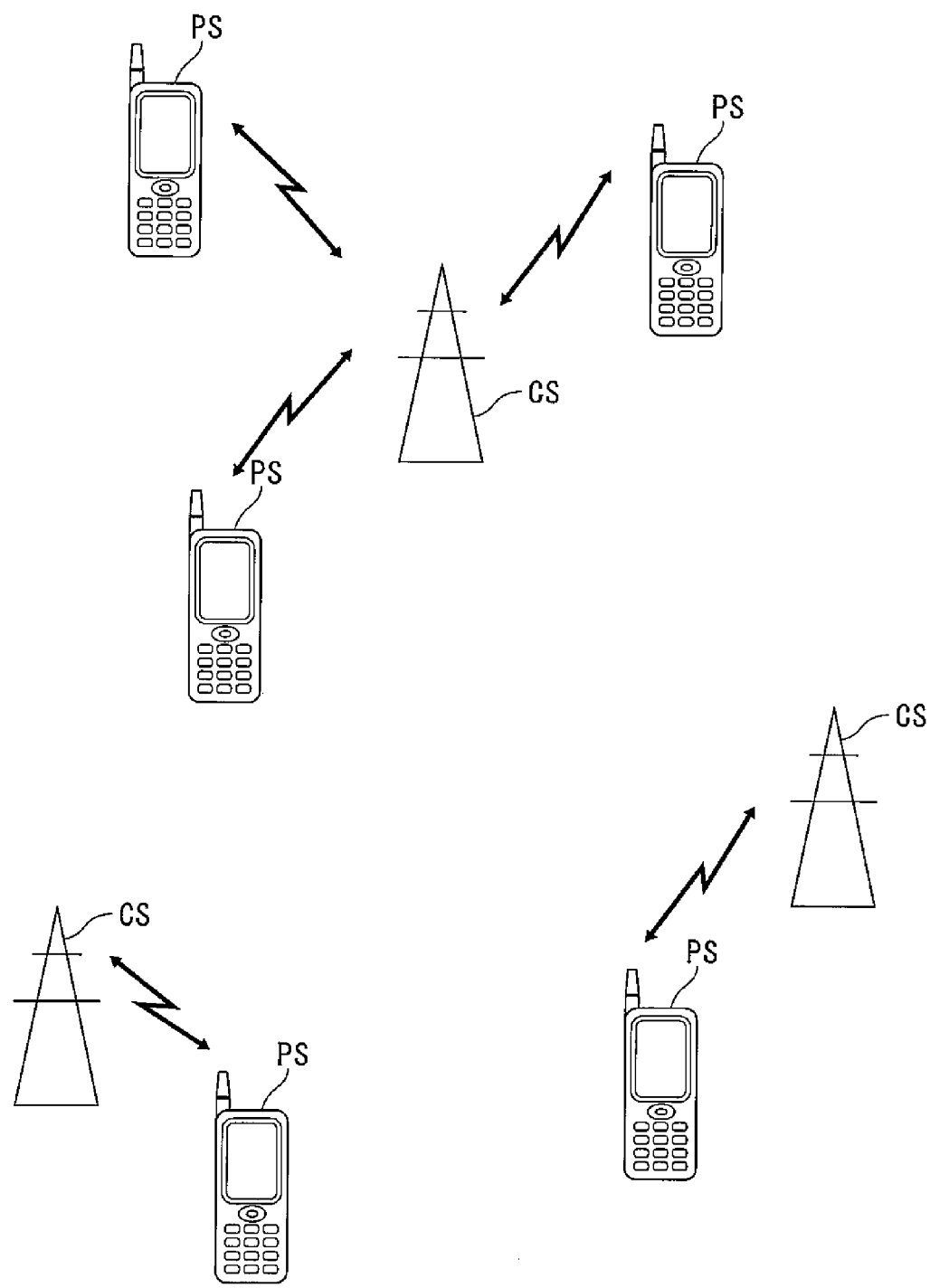
FIG. 1 is a drawing showing an outline constitution of a wireless communication system of one embodiment.

CS . . . . Base station
PS . . . wireless communication terminal
1 . . . QoS control portion
2 . . . scheduler
3 . . . communication control portion
4 . . . bandwidth assignment portion
5 . . . MAC-PDU constitution portion
6 . . . PHY-PDU constitution portion
7 . . . error correction coding portion
8 . . . modulation portion
9 . . . transmission portion
10 . . . reception portion
11 . . . demodulation portion
12 . . . error correction decoding portion
13 . . . PHY-PDU analysis portion
13a . . . MAC-ARQ response determination portion
14 . . . retransmission control portion
15 . . . data reconstitution portion

BEST MODE FOR CARRYING OUT THE INVENTION

Hereinafter, in reference to the drawings, preferable embodiments of the present invention are explained. It should be noted that the following embodiments are not limitations on the present invention, and for example, it is possible to appropriately combine constitutional elements of the embodiments shown below.

Here, one embodiment of a wireless communication system is explained in which OFDMA (Orthogonal Frequency Division Multiple Access) method is used.

Figure 2:
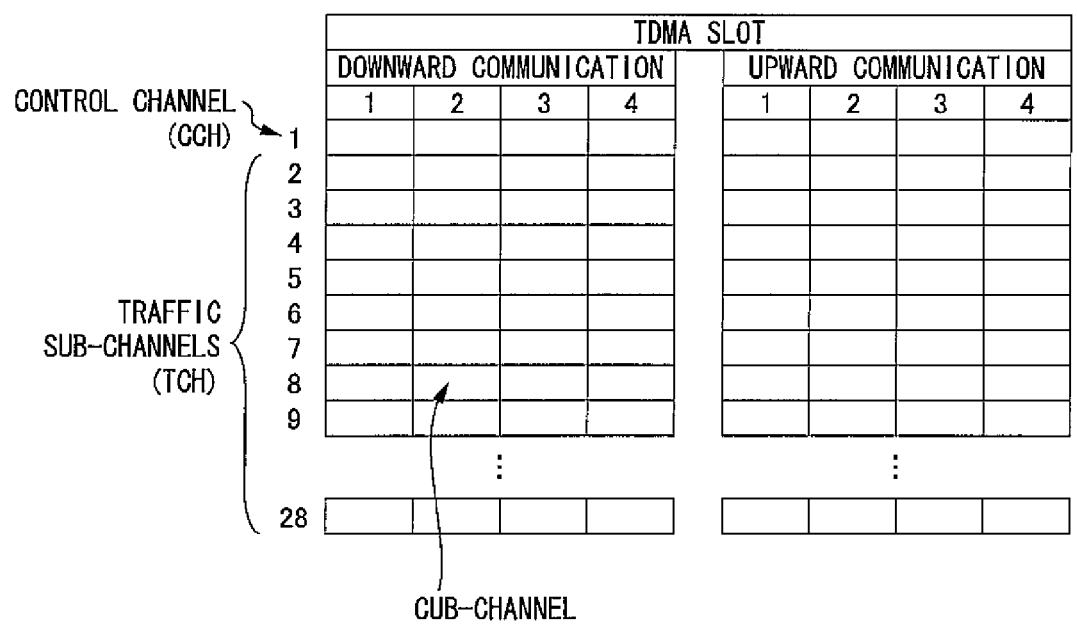
FIG. 2 is an outline showing relationships between a frequency, TDMA slots and sub-channels of a wireless communication system of one embodiment.

It is generally known that OFDMA is a technique in which all subcarriers that orthogonally cross each other are shared by all wireless communication terminals PS, a set of arbitrarily selected multiple subcarriers are determined as a group, and a multiple access operation is realized by adaptively assigning one or multiple groups to each of the wireless communication terminals PS. In addition to the OFDMA technique described above, the wireless communication system of this embodiment is a combination of techniques including a time division multiple access (TDMA) and a time division duplex (TDD). In other words, each group is divided into up-link and down-link along a time axis by applying TDD, and in addition, the up-link each and down-link each are divided into four TDMA slots. In this embodiment, one unit is called a "sub-channel" which is obtained by, along the time axis, dividing each group as the TDMA slots. FIG. 2 shows relationships between the frequency, TDMA slots and sub-channels of the wireless communication system of this embodiment. An axis along a vertical direction indicates the frequency, and an axis along a horizontal direction indicates the time. As shown in FIG. 2, 112 sub-channels are provided by multiplying 28 along a direction of the frequency by 4 (four slots) along a direction of the time axis. In addition, 112 sub-channels are respectively assigned to the up-link and the down-link.

In the wireless communication system of this embodiment, as shown in FIG. 2, sub-channels provided at an end along a direction of the frequency (No. 1 in FIG. 2) are used as control channels (CCH). In addition, other sub-channels shown in FIG. 2 are used as traffic sub-channels (TCH). One or more than one traffic sub-channel of all traffic sub-channels (in this case, 108 sub-channels of 27×4 slots excluding CCH) included in the up-link and down-link are arbitrarily selected and assigned to the base station CS and the wireless communication terminal PS that are conducting wireless communication. It should be noted that the same traffic sub-channels are assigned to the traffic sub-channels used for up-link and down-link as the communication channels.

As shown in FIG. 1, the wireless communication system of this embodiment is constituted from the base station CS, the wireless communication terminals PS and a network which is not shown in the drawing. The base station CS and the wireless communication terminals PS conduct a communication operation by using multiple access techniques such as a time division multiple access, a time division duplex and an orthogonal frequency division multiplex access (OFDMA). There are multiple base stations CS that are provided at predetermined intervals, establish multiplex connections and conduct wireless communications with multiple wireless communication terminals PS. Hereinafter, a case is shown as an example in which the base station CS is a transmission side, and in which the wireless communication terminal PS is a reception side, and in this example, the Stop-and-wait method is used as a method of MAC-ARQ.

Figure 3:
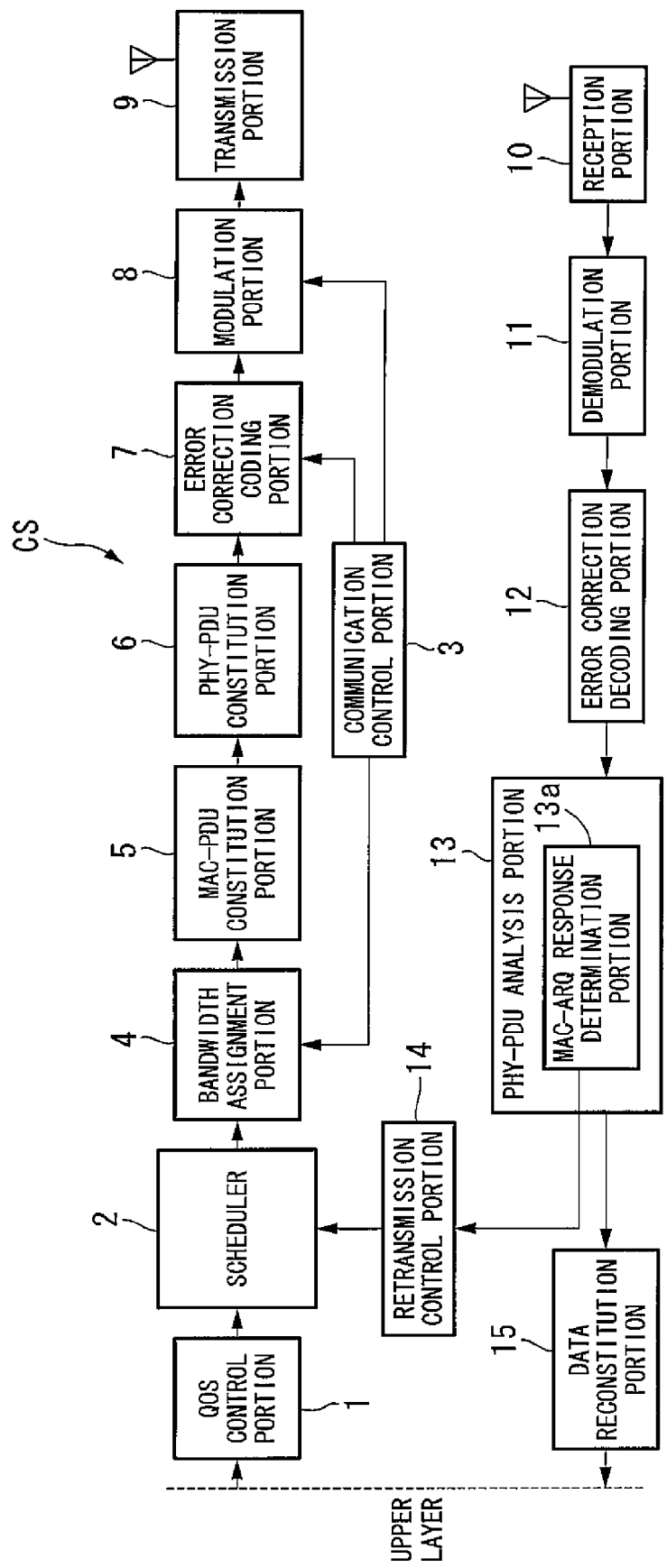
FIG. 3 is a constitutional block diagram of a base station CS of one embodiment.

FIG. 3 is a block diagram showing an outline of a constitution of the base station CS of this embodiment. As shown in FIG. 3, the base station CS includes a QoS (Quality of Service) control portion 1, a scheduler 2, a communication control portion 3, a bandwidth assignment portion 4, a MAC-PDU (Media Access Control-Protocol Data Unit) constitution portion 5, a PHY-PDU (PHYsical-Protocol Data Unit) constitution portion 6, an error correction coding portion 7, a modulation portion 8, a transmission portion 9, a reception portion 10, a demodulation portion 11, an error correction decoding portion 12, a PHY-PDU analysis portion 13, a retransmission control portion 14 and a data reconstitution portion 15. In addition, the PHY-PDU analysis portion 13 includes a MAC-ARQ response determination portion 13a.

It should be noted that, in the base station CS, QoS control portion 1, the scheduler 2, the communication control portion 3, the bandwidth assignment portion 4, the MAC-PDU constitution portion 5, the PHY-PDU constitution portion 6, the PHY-PDU analysis portion 13, the retransmission control portion 14 and the data reconstitution portion 15 are constitutional elements providing functions applied to the MAC (Media Access Control) layer. In addition, the error correction coding portion 7, the modulation portion 8, the transmission portion 9, the reception portion 10, the demodulation portion 11 and the error correction decoding portion 12 are constitutional elements providing functions applied to physical layer. It should be noted that in FIG. 3, a description of a constitution corresponding to a higher layer than the MAC layer is omitted.

Based on, for example, an application program executed on a higher layer and/or a priority of a user of the wireless communication terminal PS, the QoS control portion 1 determines and assigns a priority to the data (payload) input from the higher layer. In addition, the QoS control portion 1 controls the scheduler 2 so as to determine and apply a transmission/reception time to a packet (that is, MAC-PDU) constituted from the input data.

The scheduler 2 conducts a flow control operation on MAC-PDU input from the QoS control portion 1. In addition, in accordance with a control by the QoS control portion 1, based on, for example, a service class assigned to the wireless communication terminal PS to which a communication is established and/or a state of a queue of the packets (MAC-PDU) transmitted between the base station CS and the wireless communication terminal PS, the scheduler 2 determines a transmission order of the packets which are going to be transmitted. On the other hand, based on a command received from the retransmission control portion 14, the scheduler 2 determines a transmission order of the packets which are going to be retransmitted. The communication control portion 3, based on a communication quality of a communication to the wireless communication terminal PS to which the communication control portion 3 connects, determines and assigns a rate of coding of the packets or a modulation method of the packets. After this, a relationship between the packet to be transmitted and the modulation method assigned to the packet is stored in a storage portion inside the communication control portion 3 that is not shown in the drawings.

It should be noted that the modulation method is for example, BPSK (Binary Phase Shift Keying), QPSK (Quadrature Phase Shift Keying) or 16QAM (Quadrature Amplitude Modulation). By selecting and applying an appropriate modulation method, it is possible to adjust a data rate of the packets to be transmitted. The modulation method corresponding to the data rate is called a modulation class. Based on, for example, information with regard to amount of transmitted data and information with regard to a usage status of sub-channels received through a bandwidth assignment portion 4 as explained below, the communication control portion 3 determines a modulation method.

The bandwidth assignment portion 4 determines sub-channels assigned to each packet based on the information received from the QoS control portion 1 regarding the priority, the information received from the scheduler 2 regarding the amount of transmitted data and regarding the bandwidth that can be used for communication and the information received from the communication control portion 3 regarding the modulation method. The information of assigning the sub-channels obtained in such a manner is called MAP information. In addition, the bandwidth assignment portion 4 provides information regarding states of using the sub-channels, that is, which sub-channel is already assigned and which sub-channel is not used. The bandwidth assignment portion 4 transmits information based on a request from the communication control portion 3. The MAC-PDU constitution portion 5 creates a MAC-PDU by appending both a MAC header and CRC (Cyclic Redundancy Checking) code to a packet input from the scheduler 2 via the bandwidth assignment portion 4, and outputs the MAC-PDU to the PHY-PDU constitution portion 6.

The PHY-PDU constitution portion 6 provides a physical layer header including control information, that is, for example, MAP information, a coding rate and a modulation method, and in order to create PHY-PDU for a downward communication, in other words, for a transmission to the wireless communication terminal PS, the PHY-PDU constitution portion 6 appends the physical layer header to the MAC-PDU which is output at predetermined times (a slot for downward communication) from the scheduler 2. The PHY-PDU constitution portion 6 outputs a bit sequence of the above-described PHY-PDU to the error correction coding portion 7. The error correction coding portion 7 is, for example, an FEC (Forward Error Correction) encoder, and based on the coding rate assigned by the communication control portion 3, the error coding correction portion 7 appends error correction codes to the bit sequence of the PHY-PDU and outputs the PHY-PDU to the modulation portion 8.

Figure 4:
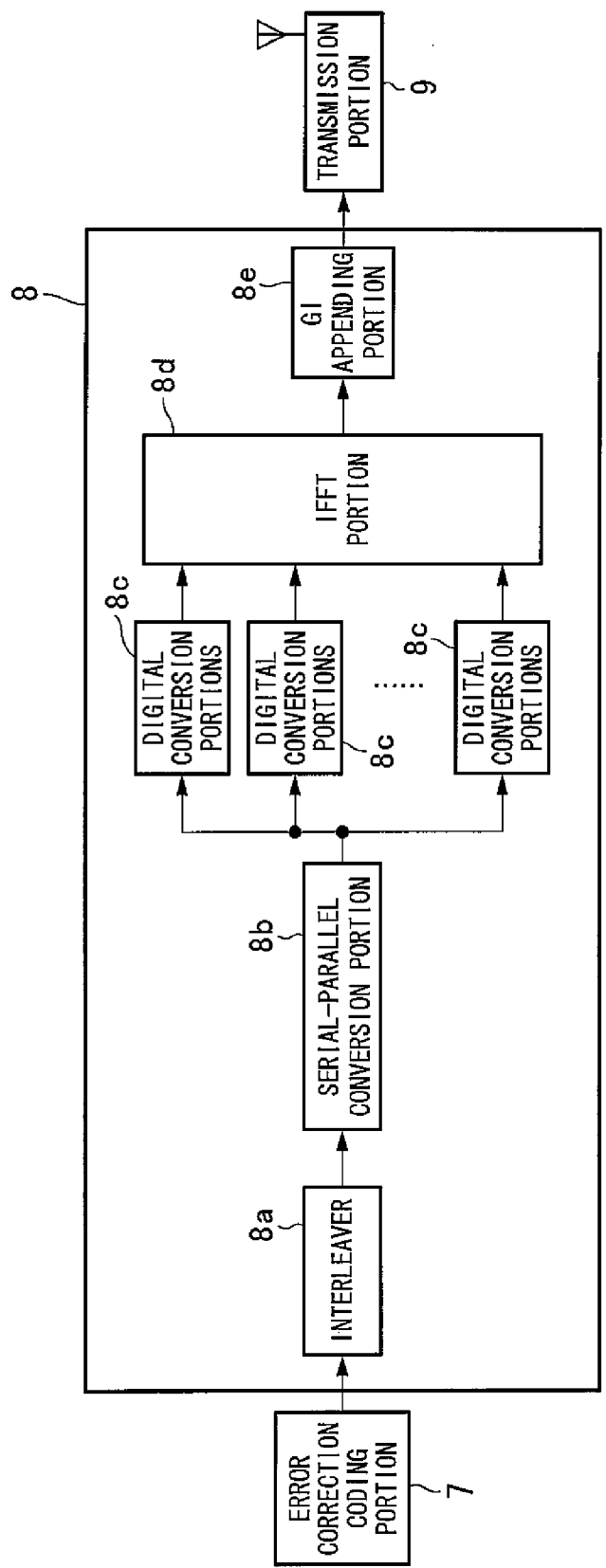
FIG. 4 is a constitutional block diagram of a modulation portion 8 of one embodiment.

FIG. 4 is a drawing which shows an outline constitution of the modulation portion 8. As shown in FIG. 4, the modulation portion 8 includes an interleaver 8a, a serial-parallel conversion portion 8b, digital conversion portions 8c, an IFFT (Inverse Fast Fourier Transform) portion 8d and a GI (Guard Interval) appending portion 8e.

The interleaver 8a conducts an interleaving operation on a bit sequence of the PHY-PDU to which an error correction code is appended by the error correction coding portion 7. After the above-described interleaving operation, the serial-parallel conversion portion 8b divides the bit sequence of the PHY-PDU in a bitwise manner so as to assign the bits the corresponding subcarriers included in the sub-channels which are assigned by the bandwidth assignment portion 4. In addition, the serial-parallel conversion portion 8 outputs bit data obtained by the above-described dividing operation to the digital modulation portions 8c. There are the same number of digital modulation portions 8c as the subcarriers. The digital modulation portions 8c input the bit data which are divided in the above operation so as to be assigned the corresponding subcarriers. By using the subcarriers corresponding to the bit data, the digital modulation portions 8c conduct a digital modulation portion on the divided bit data, obtain a modulated signal, and output the modulated signal to the IFFT portion 8d. It should be noted that each of the digital modulation portions 8c conducts the digital modulation operation in accordance with the modulation method determined by the communication control portion 3, for example, BPSK (Binary Phase Shift Keying), QPSK (Quadrature Phase Shift Keying), 16QAM (Quadrature Amplitude Modulation) or 64QAM.

The IFFT portion 8d inputs the modulated signal from each of the digital modulation portions 8c and conducts an orthogonal multiplexing operation on the modulated signal by an inverse Fourier transform in order to obtain an OFDM signal. The IFFT portion 8d outputs the OFDM signal to the GI appending portion 8e. The GI appending portion 8e inputs the OFDM signal from the IFFT portion 8d, appends the guard interval (GI) to the OFDM signal and outputs the OFDM signal to the transmission portion 9.

Hereinafter, an explanation regarding FIG. 3 is continued. The transmission portion 9 inputs the OFDM signal from the GI appending portion 8e, converts the OFDM signal to an RF signal and transmits the RF signal to the wireless communication terminal PS. The reception portion 10 receives the RF signal transmitted from the wireless communication terminal PS, conducts a frequency conversion operation on the RF signal in order to obtain the OFDM signal and outputs the OFDM signal to the demodulation portion 11.

The demodulation portion 11 conducts a demodulation operation on the OFDM signal (received signal) input from the reception portion 10. More specifically, the demodulation portion 11 conducts an inverse operation compared to the modulation portion 8 in order to demodulate the received signal. In other words, the demodulation portion 11, first, removes the guard interval from the received signal and, by conducting the FFT operation, divides the received signal into the modulated signals corresponding to the subcarriers. After this, the demodulation portion 11 conducts a digital demodulation operation on each of the modulated signals and obtains the bit data. The demodulation portion 11 conducts a parallel-serial conversion on the bit data. In addition, the demodulation portion 11 conducts a deinterleaving operation in order to reconstitute the bit sequence. It should be noted that the reconstituted bit sequence shows the PHY-PDU received from the wireless communication terminal PS.

The error correction demodulation portion 12 which is, for example, an FEC decoder, conducts an error correction operation on the bit sequence of the received PHY-PDU input from the demodulation portion 11, and outputs the bit sequence after the error correction operation to the PHY-PDU analysis portion 13. The PHY-PDU analysis portion 13 analyzes the bit sequence of the received PHY-PDU, extracts various control information included in the physical layer header and the MAC header, extracts the payload which is the data, extracts the MAC-PDU, conducts other operations, and after this, outputs the extracted data to the data reconstitution portion 15. The MAC-ARQ response determination portion 13a of the PHY-PDU analysis portion 13 analyzes the received PHY-PDU. Based on the analysis results, the MAC-ARQ response determination portion 13a determines whether the received PHY-PDU is an ACK signal or a NACK signal with regard to the MAC-ARQ, and outputs the determination result to the retransmission control portion 14.

The retransmission control portion 14 inputs the determination result from the MAC-ARQ response determination portion 13a. If the received PHY-PDU is a NACK signal with regard to the MACK-ARQ, the retransmission control portion 14 controls the scheduler 2 to retransmit the packet which corresponds to a retransmission request from the wireless communication terminal PS by using the MAC-ARQ method. In addition, if the received PHY-PDU is an ACK signal with regard to the MACK-ARQ, the retransmission control portion 14 controls the scheduler 2 to transmit a next packet (MAC-PDU) to the wireless communication terminal PS.

The data reconstitution portion 15 rearranges an order among the MAC-PDU included in one group and input from the PHY-PDU analysis portion 13. After this, the data reconstitution portion 15 removes both the MAC header and the CRC code from each of the MAC-PDU with regard to this one group, and obtains the data (payload) which is applied to the upper layers. The data reconstitution portion 15 then outputs the data to the upper layer.

It should be noted that the base station CS is explained above in reference to FIG. 3, and the wireless communication terminal PS includes the similar constitutional elements as the base station CS (therefore, not shown in the drawings). However, the QoS control portion 1, scheduler 2, communication control portion 3 and bandwidth assignment portion 4 of the base station CS are included in only the base station CS, and the wireless communication terminal PS does not include such constitutional elements. Therefore, if the wireless communication terminal PS transmits a retransmission request of a packet to the base station CS, the wireless communication terminal PS is notified with regard to a sub-channel used for retransmission, a modulation method and an assigned coding rate.

Figure 5:
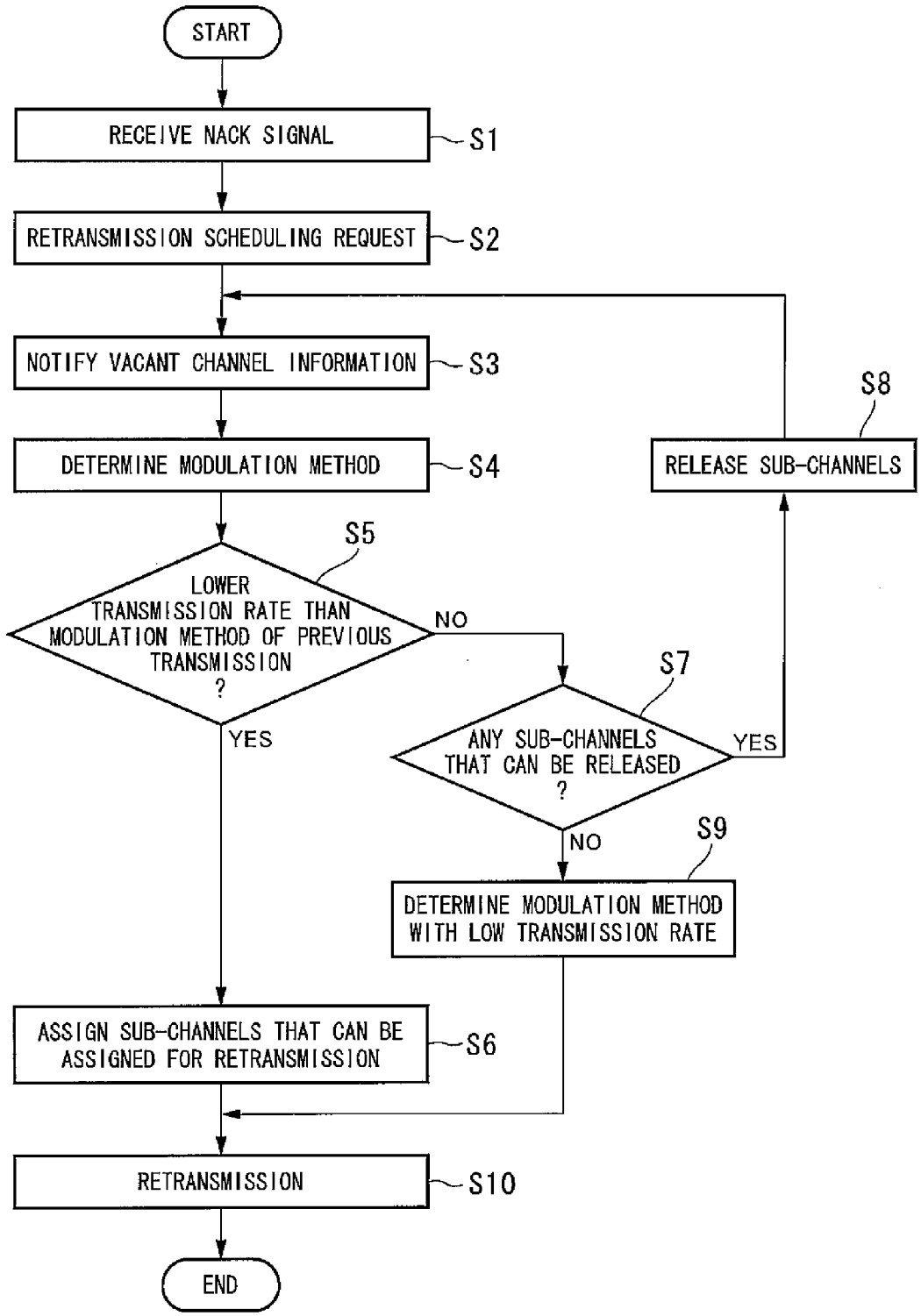
FIG. 5 is an operational flow chart of a base station CS of one embodiment.

In the following, in reference to a flowchart of FIG. 5, an operation of retransmission of the base station CS which has the above-described constitution is explained. It should be noted that, in the following explanation, the base station CS is a transmission side, and the wireless terminal apparatus PS is a reception side. In addition, there is a precondition in which the base station CS applied a modulation method (for example, 16QAM) which has a high transmission rate when previously transmitting a packet, and in which the wireless communication terminal PS transmitted a NACK signal to the base station CS.

The base station CS receives the NACK signal from the wireless communication terminal PS via the receiving portion 10 (step S1). The PHY-PDU analysis portion 11 inputs the above-described NACK signal via both the demodulation portion 11 and error correction demodulation portion 12. In the PHY-PDU analysis portion 11, the MAC-ARQ response determination portion 13a analyzes the received PHY-PDU which indicates the above-described NACK signal. The MAC-ARQ response determination portion 13a detects that the received PHY-PDU is an NACK signal and outputs the determination result to the retransmission control portion 14. Based on the determination result of the MAC-ARQ response determination portion 13a, the retransmission control portion 14 requests the scheduler 2 to retransmit the packet corresponding to the retransmission request from the wireless communication terminal PS (step S2).

The scheduler 2, based on a command from the retransmission control portion 14, determines a transmission order of packets to be retransmitted and outputs the retransmission packets to the bandwidth assignment portion 4 in accordance with the transmission order. The bandwidth assignment portion 4 notifies the information regarding a status of using the sub-channels of the communication control portion 3 (step S3).

The communication control portion 3, based on both an amount of data of the packets to be retransmitted and the information regarding the sub-channels (here, a number of sub-channels which can be assigned), determines a modulation method to conduct a retransmission without deteriorating a data rate of a previous packet transmission (step S4). Here, "without deteriorating a data rate" means that the data included in the packets requested to be retransmitted should be transmitted by using the same number of packets or less. In other words, the data rate is determined based on a proportional relationship between a number of available sub-channels (communication bandwidth) and a modulation class. Therefore, when the number of sub-channels is increased, it is possible to use a comparatively lower modulation class if the data rate is not deteriorated (is not lowered). However, if the number of the sub-channels is decreased, it is necessary to use a comparatively higher modulation class to avoid deteriorating the data rate. After this, the communication control portion 3 determines whether or not the selected modulation method is a modulation method of a lower class compared to a modulation method of a previous packet transmission (step S5).

In the above-described step S5, if the modulation method that is aimed to transmit the packets without deteriorating a throughput compared to the previous packet transmission is a modulation method of a lower class compared to a modulation method of the previous packet transmission ("Yes"), all sub-channels that can be assigned are assigned as the retransmission sub-channels (step S6). In a concrete case, if there are a large number of sub-channels that can be assigned as the retransmission sub-channels, for example, by using a modulation method such as BPSK providing a low transmission rate, it is possible to increase the probability as high as possible of reliably transmitting the retransmission packets and to maintain a certain level of data rate.

On the other hand, in the step S5, if the selected modulation method has a higher transmission rate than a transmission rate of the previous packet transmission ("No"), the communication control portion 3 issues a query to the bandwidth assignment portion 4 whether or not there are sub-channels that are used for communicating with other wireless communication terminal PS and that can be released. The bandwidth assignment portion 4 determines whether or not there are sub-channels that can be released (step S7). In a concrete example, based on a service class of a QoS control assigned to each of the wireless communication terminals PS, it is determined whether or not there are sub channels that can be released. There are various types of service classes, for example, in a descending order of priority, there is (1) a Conversational Class (example of service: VoIP), (2) a Streaming Class (example of service: video distribution), (3) an Interactive Class (example of service: HTTP) and (4) a Background Class (example of service: E-Mail), and a memory portion not shown in the drawings stores a relationship between the service classes and the corresponding wireless communication terminals PS. The sub-channels are preferentially assigned to the wireless communication terminals PS to which a service class with high priority is set, and the sub-channels are not released with regard to such the wireless communication terminals PS. However, the sub-channels of the wireless communication terminals PS are released to which a service class with a low priority, for example, Background Class, is set.

In other words, based on a relationship of the service classes stored in the memory portion that are assigned to both the wireless communication terminal PS to which the packets are retransmitted and other wireless communication terminals, the bandwidth assignment portion 4 determines whether or not there are wireless communication terminals that have lower priority than the wireless communication terminal PS to which the packets are retransmitted, and based on such a determination, the bandwidth assignment portion 4 determines whether or not there are sub-channels that can be released. If there are sub-channels that can be released in the step S7 ("Yes"), the bandwidth assignment portion 4 releases the sub-channels that can be released and assigns the released sub-channels as the retransmission sub-channels (step S8). That is, as a result of the step S8, it is possible to assign the sub-channels more than the previous time. After this, the operation goes to the step S3 and is continued.

On the other hand, in the step S7, if there are not sub-channels that can be released ("No"), that is, if it is not possible to provide the vacant sub-channels and released sub-channels sufficient for maintaining the data rate, the communication control portion 3 assigns a comparatively higher priority to achieve a probability of successful transmission and selects a modulation method for retransmission that has a low transmission rate (step S9). It should be noted that, in the step S9, if it is determined that maintaining the data rate should have a comparatively high priority, it is possible to apply a modulation method with a comparatively high transmission rate to a modulation method for retransmission.

After this, the retransmission packets are sent to the wireless communication terminal PS via the MAC-PDU constitution portion 5, PHY-PDU constitution portion 6, error correction coding portion 7, modulation portion 8, and transmission portion 9 (step S10).

As described above, in accordance with the above-described embodiment, when a modulation method with a low transmission rate is used upon retransmitting the MAC-ARQ, a number of assigned sub-channels is increased as much as possible (in other words, a large bandwidth is provided), hence, it is possible to avoid a low data rate, and it is possible to increase a percentage of successful transmission of retransmission packets. Therefore, it is possible to prevent the throughput from being deteriorated.

It should be noted that, in the above described embodiment, an example of the base station CS of a wireless communication system is explained which provides an orthogonal frequency division multiplex access (OFDMA) in addition to a time division multiple access (TDMA) and a time division duplex (TDD). However, this is not a limitation. It is possible to apply the present invention to, for example, a base station of a wireless communication system in which a communication of packets between the wireless communication apparatuses is conducted in a time division multiple communication method by using one or more than one communication channels, and a base station of a wireless communication system in which a communication between the wireless communication apparatuses is conducted in a time division multiple communication method by using a multiple carrier communication method in which frequency bands are adaptively assigned among the wireless communication apparatuses.

INDUSTRIAL APPLICABILITY

Therefore, it is possible to prevent a low data rate of retransmission of packets when using MAC-ARQ, and it is possible to reliably transmit the data to a receiver. As a result, it is possible to prevent a low throughput of packet communication.

The invention claimed is:

1. A base station apparatus which conducts a packet communication with a wireless communication terminal comprising:
   a retransmission request detection unit which detects a retransmission request from the wireless communication terminal;
   a bandwidth assignment unit which assigns a communication bandwidth applied to the packet communication;
   a modulation class calculation portion, based on both bandwidth information regarding the bandwidth assigned by the bandwidth assignment unit and a data amount of packets corresponding to the retransmission request, calculates a modulation class applied to a retransmission in order to adjust a number of retransmitted packets to be the same as a number of previously transmitted packets;
   a modulation class determination unit which determines whether or not the modulation class is lower than a modulation class applied to a previous packet transmission; and
   a retransmission unit which retransmits packets corresponding to the retransmission request based on the determination result regarding the modulation class.

2. A base station apparatus according to claim 1, wherein the communication bandwidth is a sub-channel used in an OFDMA method in which a communication bandwidth applied to a communication is used as a unit of sub-channel constituted from a plurality of subcarriers.

3. A base station apparatus according to claim 2, wherein based on the determination result of the modulation class, if the modulation class is lower than the previous packet transmission, the bandwidth assignment unit determines whether or not there are sub-channels that are assigned to other communication and can be released, and
if there are sub-channels that can be released, the bandwidth assignment unit releases the sub-channels.

4. A base station apparatus according to claim 1, wherein based on the determination result of the modulation class determination unit, if the modulation class is lower than the previous packet transmission, the retransmission unit retransmits the packets corresponding to the retransmission request.

5. A base station apparatus according to claim 4, wherein when the retransmission unit retransmits the packets corresponding to the retransmission request based on the determination result of the modulation class, the bandwidth assignment unit assigns more sub-channels than a number of sub-channels that are assigned in the previous packet transmission.

6. A wireless communication method in which a base station apparatus conducts a packet communication with a wireless communication terminal comprising:

a retransmission request detection step of detecting a retransmission request from the wireless communication terminal;

a bandwidth assignment step of assigning a communication bandwidth applied to the packet communication;

a modulation class calculation step of, based on both bandwidth information regarding the bandwidth assigned by the bandwidth assignment unit and a data amount of packets corresponding to the retransmission request, calculating a modulation class applied to a retransmission in order to adjust a number of retransmitted packets to be the same as a number of previously transmitted packets;

a modulation class determination step of determining whether or not the modulation class is lower than a modulation class applied to a previous packet transmission; and a retransmission step of retransmitting packets corresponding to the retransmission request based on the determination result regarding the modulation class.

* * * * *